United States Patent [19]

Eidem

[11] 4,440,579

[45] Apr. 3, 1984

[54] AIR BLOWING ASPHALT USING SULFONIC ACID CATALYST

[75] Inventor: Penny K. Eidem, Point Richmond, Calif.

[73] Assignee: Chevron Research Company, San Francisco, Calif.

[21] Appl. No.: 445,400

[22] Filed: Nov. 30, 1982

[51] Int. Cl.³ .............................................. C08L 95/00
[52] U.S. Cl. ..................................... 106/274; 208/23; 208/44
[58] Field of Search .................. 106/274, 277; 208/44

[56] References Cited

U.S. PATENT DOCUMENTS 3,876,416  4/1975  Yamaki et al. .................. 106/274 X
4,021,356  5/1977  Kadchadker et al. ............. 208/44 X

FOREIGN PATENT DOCUMENTS 729158  4/1980  U.S.S.R. .............................. 106/274

Primary Examiner—John Kight, III
Assistant Examiner—Garnette D. Draper
Attorney, Agent, or Firm—D. A. Newell; J. M. Whitney; Q. T. Dickinson

[57] ABSTRACT

A process for air blowing asphalt in the presence of organic sulfonic acids and an asphalt composition comprising a major amount of asphalt and a minor but effective amount of organic sulfonic acid.

16 Claims, No Drawings

AIR BLOWING ASPHALT USING SULFONIC ACID CATALYST

BACKGROUND OF THE INVENTION

The present invention discloses an asphalt composition suitable for use in air blowing and the process of air blowing the same, both using sulfonic acids as catalysts.

Air blowing of asphalt is a process by which stock asphalt is converted to an asphalt product having more desirable properties by the forced introduction of air by blowing at temperatures ranging from 400° to 500° F. In its unprocessed forms, asphalt may be unsuitable for particular applications due to excessive brittleness or a too low softening point. The degree of brittleness is referred to as penetration. The modification of the softening point/penetration properties by air blowing permits the manufacturer of the asphalt to specifications otherwise not possible. Additionally, it is well known that the use of a catalyst during air blowing further improves the softening point and penetration of the asphalt. Catalyst use also reduces the time required to bring the asphalt to the desired softening point, a significant economic benefit.

Commonly used and well-known air blowing catalysts, many of which have been patented, include ferric chloride, $FeCl_3$, U.S. Pat. No. 1,782,186, phosphorous pentoxide, $P_2O_5$, U.S. Pat. No. 2,450,756, aluminum chloride, $AlCl_3$, U.S. Pat. No. 2,200,914, boric acid, U.S. Pat. No. 2,375,117, copper sulfate $CuSO_x$, zinc chloride $ZnCl_2$, phosphorous sesquesulfide, $P_4S_3$, phosphorous pentasulfide, $P_2S_5$ and phytic acid, $C_6H_6O_6(H_2PO_3)_6$. Also useful as catalysts are phosphoric acid $H_3PO_4$ and ferrous chloride $FeCl_2$, U.S. Pat. No. 4,338,137. By far, the most useful and commonly used of the catalysts are ferric chloride and phosphorous pentoxide.

The primary reason for the popularity of $FeCl_3$ and $P_2O_5$ is the fact that they are readily obtained and relatively inexpensive to use. They do, however, have serious drawbacks. In particular, $FeCl_3$ when used at the elevated temperatures to air-blow asphalt, produces hydrogen chloride gas, HCl, as a by-product. This gas is not only very corrosive, but can create significant air pollution and healt problems if released into the atmosphere.

Additionally, the use of ferric chloride as a catalyst contributes to two other negative characteristics of the asphalt which raise problems in meeting desired specifications. One characteristic, called skinning, results from the heating of industrial asphalts in the presence of air at elevated temperatures. A tough, insoluble skin is formed on the surface of the asphalt which is extremely insoluble in the asphalt itself. This skin causes problems both to the refiner and the asphalt customer. It has been found that the skinning tendency of the asphalt increases when ferric chloride is used as the catalysts in air blowing.

A second undesirable characteristic resulting from the use of ferric chloride catalysts is known as "fallback". Fallback is a drop in the softening point which air-blown asphalt may undergo when held at a stable elevated temperature. When asphalt is held over time at elevated temperatures, the softening point-penetration ratio reduces or "falls back" outside of the desired specification range even though it is being held at a constant temperature. This may be caused or aggravated by various mixture components, particularly $FeCl_3$.

The present invention overcomes both these skinning and fallback problems to a much greater degree than the ferric chloride catalyst which is a known contributor to both problems.

SUMMARY OF THE INVENTION

The present invention comprises an air-blown asphalt composition comprising asphalt and a catalytic amount of an organic sulfonic acid. The sulfonic acid, when used in air-blown asphalt, increases the penetration, at a given softening point resulting in a more industrially desirable asphalt composition. It also allows the use of less desirable crude stocks. Additionally, the catalyst causes the air blowing reaction to proceed at a faster rate, thereby reaching the desired softening point sooner than without the catalyst. Moreover, the use of the organic sulfonic acid does not result in undesirable irritating or corrosive by-products and reduces the amount of skinning and fallback in the final composition.

The organic sulfonic acids may be either aromatic or aliphatic in nature and should possess sufficient carbon atoms to render the catalyst soluble in asphalt. The catalytic amount of sulfonic acid producing the desired result ranges from 0.25 weight percent to 10 weight percent, and the preferred range is 0.5 weight percent to 3 weight percent of the total composition.

DETAILED DESCRIPTION OF THE INVENTION

Organic sulfonic acids are introduced into asphalt as a catalyst for air blowing. The sulfonic acids are added in an amount from about 0.25 weight percent to about 10 weight percent of the total catalyzed asphalt composition. In the preferred embodiment of the invention the sulfonic acid catalyst comprises from about 0.5 weight to about 3 weight percent of the total composition. The sulfonic acids accelerate the speed with which the air blowing reaction proceeds to the desired specifications and results in equivalent or higher penetrations at the desired softening point than other catalysts, and considerably higher penetration than with no catalyst. Additionally, the sulfonic acid catalysts minimize skinning and fallback tendencies of the asphalt and eliminate the evolution of corrosive or essentially harmful vapors, such as HCl.

The asphalt stock suitable for use can be of varied character. Any petroleum residua or flux, remaining following the separation of vaporizable hydrocarbons through lubricating oil fractions or any relatively high molecular weight extract obtained from petroleum refining or virgin, naturally occurring asphalt can be used. For example the residua from Alaskan North Slope/Waxy Light Heavy crude blend, Arabian Heavy crude, Arabian Light crude, and the like, can be used. Of course, the difference in the asphalt stock will result in different properties in the finished air blowing asphalt. The organic sulfonic acids finding use in this invention include both alkyl sulfonic acids and aromatic sulfonic acids. The alkyl substituent may be the straight, branched, or cyclic and may be exemplified by the formula:

where R is an alkyl substituent of not more than 1 to 20 carbon atoms. Examples of suitable alkyl sulfonic acids include: methane sulfonic acid, ethan sulfonic acid, t-butane sulfonic acid, 2-propane sulfonic acid and cyclohexyl sulfonic acid. The R substituent R group may also include alkene groups, the catalyst then being an alkene sulfonic acid. By "alkene" in this sense is meant not only true, i.e. essentially all alkene sulfonic acids, but also those alkene sulfonic acids made by reacting an olefin, preferably an alpha-olefin, with $SO_3$. The resulting composition is a mixture of compounds and is a commercially available product made by the above reactions consisting of pure alkenes and dimers thereof. Examples include: alpha-olefin sulfonic acid, dimerized alpha-olefin sulfonic acid, and 2-hexene sulfonic acid.

The sulfonic acid catalysts may also consist of aromatic sulfonic acids wherein the aromatic portion of the composition is either benzene or naphthalene. The aromatic compositions are exemplified by the formulae:

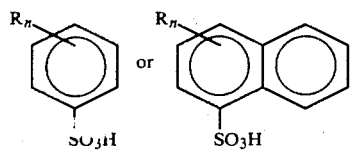

wherein R may be any straight or branched alkyl substituent having from 1 to 20 carbon atoms or hydrogen; and n is either 1 or 2. The R groups are separate and independent and may be in any position para, ortho, or meta to the $SO_3H$ group on the ring containing the $SO_3H$ group. It has been noted that the longer the chain on the R groups, the more soluble the catalyst is in asphalt. However, it is also noted that catalytic activity was found to decrease with the increased length of the alkyl substituent. Examples include: benzene sulfonic acid, para-toluene sulfonic acid and naphthalene sulfonic acid.

The preferred sulfonic acid catalyst is para-toluene sulfonic acid (HPTS); molecular weight 163, and formula:

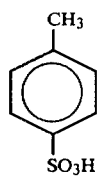

Other sulfonic acids which may be used include light alkane sulfonic acid, ("HLAS") which is a mixture of t-butyl and t-amyl benzene sulfonic acids, MW 242; alkane$_{56}$ sulfonic acid (Chevron trade name), "HA$_{56}$S"; consisting essentially of polypropylene benzene sulfonic acid wherein the number of propylene carbons is essentially 6 to 16, MW 256-396; and alkane$_{60}$ sulfonic acid (Chevron trade name) "HA$_{60}$S", consisting essentially of polypropylene benzene sulfonic acid wherein the number of carbons of the propylene is essentially 6 to 18, MW 256-424.

The composition is formulated by heating asphalt to a temperature of about 200° to 350° F. and thoroughly mixing the sulfonic acid catalyst in the asphalt prior to air blowing. Thereafter the asphalt-sulfonic acid composition is air-blown in accordance with procedures known in the art, such as those taught in U.S. Pat. Nos. 2,450,756, 2,762,755, and 3,126,329, said patents incorporated herein by reference.

More specifically, the asphalt is heated to a temperature of from about 400° F. to about 550° F. and air, oxygen or an oxygen-inert gas mixture is bubbled or blown through the composition for sufficient time to achieve a desired softening point. Generally, the air blowing operation is carried out for a period of from about 0.5 hour to about 12 hours.

Having described the invention, the following examples are intended to be illustrative and not limit the scope of the invention.

Additionally, the following examples were carried out in two different related apparatus systems. In one, the so-called "mini-still", a laboratory scale situation was used, employing approximately 250 to 300 grams of the asphalt material. In the second, a pilot plant scale asphalt-turbo-still, an approximately 3000-gram capacity sample was employed. The two methods correlated well and their results are as illustrated in the tables following the examples.

EXAMPLES

Example 1

In this example, the mini-still apparatus was employed using a Glas-Col heating mantle surrounding a one quart metal container, a heat control unit with thermocouple, a stirrer with Cowles blade attached, and an air supply connected to a ⅛ inch air line into the air blowing container. 250 grams of air blowing asphalt flux into which 1.0 weight percent of para toluene sulfonic acid was added, was placed in a one-quart metal container and covered with aluminum foil. The container and contents were heated to 325° F. for approximately one hour. The stirrer and air line were introduced into the container with the stirrer placed such that the Cowles blade just misses touching the bottom of the container. The stirring was begun and the temperature controller was increased to 400° F. A nitrogen line was introduced through the container cover, blanketing the surface of the asphalt with inert nitrogen gas. The stirrer was set at a speed such that turbulence and oxidation were introduced into the asphalt flux mixture, contributing to the air-blown effect. The temperature was gradually increased to 500° F. and the speed of the stirrer set at approximately 850 rpm. Air was introduced at approximately 120 cc per minute (one-half of the air rate used in the turbo-still). At points through the test run, samples were taken for softening points. The time it takes to reach 220° F. softening point was also noted. It took 103 minutes to reach the 220° F. softening point, at which point the composition was tested for and had a penetration of 14 decimillimeters (dmm) at 77° F.

FURTHER EXAMPLES

Further examples were carried out in accordance with Example 1 in both the mini-still and pilot plant apparatus using para-toluene sulfonic acid, alkane$_{56}$ sulfonic acid, alkane$_{60}$ sulfonic acid, and ferric chloride $FeCl_3.6H_2O$ and no catalyst for comparison. The results of those experiments are outlined in Table I and the comparative examples in Tables II and III.

For those experiments not using the mini-still, a 3000-gram capacity asphalt turbo still pilot plant was used which employs a temperature control vessel fitted with high speed rotostatic mixer providing excellent contact with injected air. The metered air was injected by tubing passing through the temperature-controlled asphalt and discharged directly below the mixer located at the bottom of the vessel. The still was also provided with an overflow vent for offgases and entrained material and has a sampling and drain valve through which samples were taken. The runs in the asphalt turbo-still pilot plant were conducted in essentially the same manner as those in the mini-still. Penetration, viscosity and softening point were tested for, as a function of time. The only difference noted being that most catalyzed runs took a somewhat shorter time to reach the 220° F. softening point in the mini-still, presumably due to the increased volume of material.

TABLE I[1]

| Example | Catalyst | Wt. % | Time to Reach 220° F. Softening Point (Min.) | Penetration[2] (dmm @ 77° F.) |
|---------|----------|-------|----------------------------------------------|-------------------------------|
| 1 | HPTS | 1.0 | 136 | 14 |
| 2-M | HPTS | 1.0 | 103 | 14 |
| 3 | HPTS | 3.02 | 124 | 19 |
| 4 | HPTS | 1.53 | 129 | 19 |
| 5 | HPTS | 0.98 | 136 | 14 |
| 6 | HPTS | 0.49 | 151 | 12 |
| 7 | HPTS | 1.5 | 113 | 15 |
| 8 | HPTS | 3.0 | 113 | 14 |
| 9 | HA$_{56}$S | 1.0 | 141 | 11 |
| 10-M | HA$_{56}$S | 1.0 | 94 | 9 |
| 11 | HA$_{60}$S | 1.0 | 144 | 10 |
| 12-M | HA$_{60}$S | 1.0 | 109 | 9 |

[1]Examples labeled "M" were run in the mini-still apparatus. All others used the turbo-still.
[2]Estimated penetrations at a 220° F. softening point.

COMPARATIVE EXAMPLES—FeCl$_3$.6H$_2$O

The procedures outlined for Example 1 were carried out with respect to the examples outlined below Table II using FeCl$_3$.6H$_2$O substituted for the sulfonic acids in an amount of 0.35 weight percent.

TABLE II[1]

| Example | Catalyst | Wt. % | Time to Reach 220° F. Softening Point (Min.) | Penetration[2] (dmm @ 77° F.) |
|---------|----------|-------|----------------------------------------------|-------------------------------|
| A-1 | FeCl$_3$.6H$_2$O | .35 | 101 | 16 |
| A-2 | FeCl$_3$.6H$_2$O | .35 | 111 | 13 |
| A-3-M | FeCl$_3$.6H$_2$O | .35 | 71 | 14 |
| A-4-M | FeCl$_3$.6H$_2$O | .35 | 89 | 16 |

COMPARATIVE EXAMPLES—No Catalysts

The procedures outlined with respect to Example 1 were again carried out, however, no catalyst was added to the asphalt. The results of these examples are tabulated below.

TABLE III[1]

| | No Catalyst | |
|---|---|---|
| Example | Time To Reach 220° F. Softening Point (Min.) | Penetration[2] (dmm @ 77° F.) |
| B-1 | 160 | 9 |
| B-2 | 152 | 11 |
| B-3M | 187 | 6 |
| B-4M | 179 | 6 |
| B-5M | 183 | 7 |

What is claimed is:

1. An asphalt composition comprising a catalytic amount of from about 0.25 weight percent to about 10 weight percent of asphalt soluble organic sulfonic acid, and asphalt in an amount to equal 100 weight percent.

2. The composition according to claim 1 in which the catalytic amount of organic sulfonic acid is from about 0.5 to about 3 weight percent.

3. An asphalt composition according to claim 1 in which the sulfonic acid is an aromatic sulfonic acid.

4. A composition according to claim 3 in which the sulfonic acid is alkylbenzene sulfonic acid.

5. The composition according to claim 4 in which the sulfonic acid is para-toluene sulfonic acid.

6. An asphalt composition according to claim 1 in which the organic sulfonic acid is an alkyl sulfonic acid.

7. An asphalt composition according to claim 1 in which the sulfonic acid is an alkene sulfonic acid.

8. A composition according to claim 7 in which the alkene sulfonic acid is alpha-olefin sulfonic acid or dimers thereof.

9. A process for producing air blowing asphalt which comprises air blowing an asphalt in the presence of from about 0.25 weight percent to about 10 weight percent organic sulfonic acid for a sufficient time to obtain a preselected softening point.

10. A process according to claim 9 wherein the organic sulfonic acid is present in an amount of from about 0.5 to about 3 weight percent.

11. The process according to claim 10 wherein the temperatures are maintained within a range of from about 400° to 550° F.

12. The process according to claim 11 wherein the air blowing is carried for a period from about 0.5 to about 12 hours.

13. The process according to claim 12 wherein the organic sulfonic acid is added to the asphalt prior to air blowing.

14. The process according to claim 13 wherein the organic sulfonic acid is selected from the group consisting of aromatic sulfonic acids, alkyl sulfonic acids and alkene sulfonic acids.

15. The process according to claim 14 wherein the organic sulfonic acid is para-toluene sulfonic acid.

16. A process according to claim 9 wherein the preselected softening point is from about 215° F. to about 235° F., and the asphalt has a resulting penetration of about 12 to about 20 dmm at 77° F.

* * * * *